(12) United States Patent
Selvan et al.

(10) Patent No.: US 7,726,197 B2
(45) Date of Patent: Jun. 1, 2010

(54) FORCE SENSOR PACKAGE AND METHOD OF FORMING SAME

(75) Inventors: Thirumani A. Selvan, Bangalore (IN); Raghu Sanjee, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 31 days.

(21) Appl. No.: 11/412,457

(22) Filed: Apr. 26, 2006

(65) Prior Publication Data
US 2007/0251328 A1 Nov. 1, 2007

(51) Int. Cl.
*G01L 1/00* (2006.01)
(52) U.S. Cl. ........................................ 73/777
(58) Field of Classification Search ............... 73/777
See application file for complete search history.

(56) References Cited

U.S. PATENT DOCUMENTS

| | | | | |
|---|---|---|---|---|
| 5,184,107 | A | | 2/1993 | Maurer ........................ 338/42 |
| 5,187,985 | A | * | 2/1993 | Nelson ........................ 73/708 |
| 5,303,593 | A | * | 4/1994 | Kremidas .................... 73/708 |
| 5,744,726 | A | * | 4/1998 | Maurer ........................ 73/727 |
| 5,760,313 | A | | 6/1998 | Guentner et al. ........ 73/862.584 |
| 5,996,419 | A | * | 12/1999 | Sokn ............................ 73/706 |
| 6,255,728 | B1 | * | 7/2001 | Nasiri et al. ................. 257/704 |
| 6,311,561 | B1 | * | 11/2001 | Bang et al. .................... 73/708 |
| 6,351,996 | B1 | * | 3/2002 | Nasiri et al. ................... 73/706 |
| 6,481,286 | B1 | * | 11/2002 | Bernstein et al. .......... 73/514.31 |
| 6,601,455 | B2 | * | 8/2003 | Kurtz et al. .................... 73/774 |
| 6,874,377 | B2 | * | 4/2005 | Karbassi et al. ......... 73/862.381 |
| 6,907,789 | B2 | * | 6/2005 | Bodin ........................... 73/753 |
| 7,287,432 | B2 | * | 10/2007 | Schnaare et al. .............. 73/706 |
| 7,462,919 | B2 | * | 12/2008 | Engling et al. ............... 257/419 |

FOREIGN PATENT DOCUMENTS

| | | |
|---|---|---|
| EP | 0091282 A2 | 10/1983 |
| EP | 1519173 A1 | 3/2005 |
| JP | 63196080 | 8/1988 |
| WO | WO 9919704 | 4/1999 |
| WO | WO 0135066 A1 | 5/2001 |
| WO | WO 01/65232 A1 | 9/2001 |
| WO | WO 2005/038422 A1 | 4/2005 |

* cited by examiner

*Primary Examiner*—Lisa M Caputo
*Assistant Examiner*—Octavia Davis

(57) ABSTRACT

A low cost force sensor package and a method of forming such a package. The force sensor has a housing or package, such as a surface mount technology package (SMT), and a piezo resistive silicon die, or other force sensing element, carried on the housing or package. An actuator is operably coupled to the force sensing element for transferring force to the sensing element in response to receiving a force from an external source. The force sensing element is configured to sense the external force and generate an output signal representing the force. A signal conditioner is also carried on the housing for receiving the output signal. When the signal conditioner is electrically coupled to the force sensing element, the signal conditioner can condition the output signal and generate a conditioned output.

21 Claims, 7 Drawing Sheets

SECTION A-A

SECTION B-B

FIG. 4  SECTION C-C

FORCE SENSOR PACKAGE AND METHOD OF FORMING SAME

TECHNICAL FIELD

Embodiments are generally related to force sensors, and in particular, to discrete force sensors and methods of manufacturing such force sensors. Embodiments are additionally related to force sensors in the form of MEMS devices. Embodiments are also related to methods of packaging force sensors and force sensor packages formed thereby.

BACKGROUND OF THE INVENTION

Force sensors are configured to measure an external force applied to the sensors and provide output signals representative of the applied force.

Discrete force sensors, such as MEMS based force sensors, have applications in medical equipment control, such as kidney dialysis machines, drug delivery systems, hematology equipment, and medical instrumentation. Other applications of discrete force sensors include ultra-low displacement sensing in robotic end-effectors and variable tension equipment to name a few.

Miniature MEMS based force sensors are used for measuring very low force with good accuracy. Such force sensors employ a force sensing component, such as piezo resistive silicon (Si) die, in combination with an actuator which is arranged to press against the silicon die in response to an external force exerted against the actuator. The silicon die includes a flexible membrane which deflects in response to the actuator pressing on the silicon die. Deflection of the membrane causes piezo resistors disposed on the silicon die to stress and change resistance. Circuitry senses the change of resistance and determines the external force from this resistance change.

There is a need to provide force sensors which can be implemented in medical and other applications more efficiently and cost effectively.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect to provide for an improved force sensor.

It is another aspect, to provide for a low cost force sensor package.

The aforementioned aspects of the invention and other objectives and advantages can now be achieved as described herein.

According to one aspect, a force sensor has a housing or package, which preferably is a surface mount technology package (SMT), and a force sensing element, which is preferably a piezo resistive silicon die, carried on the housing or package. An actuator is operably coupled to the force sensing element for transferring force to the sensing element in response to receiving a force from an external source. The force sensing element is configured to sense the external force and generate an output signal representing the force. A signal conditioner is also carried on the housing for receiving the output signal, whereby, when the signal conditioner is electrically coupled to the force sensing element, the signal conditioner can condition the output signal and generate a conditioned output.

A discrete, low cost force sensor package can be provided by arranging the signal conditioner on the same housing as the actuator and sensing element. Advantageously, a single package can be mounted on a circuit (not shown), such as a PCB, with a smaller surface area than the surface area required to mount existing force sensing and signal conditioning hardware separately so that less total surface area is occupied on the circuit.

The force sensing element can be isolated from the signal conditioner. Isolating the force sensing element from the signal conditioner enables the force sensing element to be maintained in a stable operating position. The force sensing element can be isolated from the signal conditioner by enclosing the sensing element in a cavity formed in the housing. The actuator can be configured on the housing to transfer force to the interior of the cavity.

The housing can define one other cavity in which the signal conditioner is enclosed. Enclosing the signal conditioner and force sensing die in respective cavities enables a robust sensor package to be provided.

The force sensing element can be a piezo resistive silicon die which is sandwiched between a pair of sealing members. The signal conditioner can be an ASIC, an instrumentation amplifier, or an operational amplifier, and optionally a temperature compensating circuit.

The force sensing element and signal conditioner can be electrically connected together internally or externally of the package. Preferably, one or more lead frames, carried on the housing, are electrically connected to the force sensing element and the signal conditioner so that the force sensing element and signal conditioner can be electrically connected via the lead frame to a printed circuit board. The force sensing element can be electrically connected to the signal conditioner via the printed circuit board.

According to another aspect, a force sensor package has a package having an external surface, an opening formed in the external surface, and a force sensing element disposed in the interior of the package. An actuator is disposed in the opening for transferring force to the interior of the package in response to receiving a force from an external source. The force sensing element is configured to detect force and generate an output signal representing the force. A signal conditioning circuit is integrated in the package for receiving the output signal, whereby, when the signal conditioner is electrically coupled to the force sensing element, the signal conditioner can condition the output signal and provide a conditioned output.

The package can be a SMT package which can have a base and a cover which are configured to assemble with one another such that the cover and base define a cavity. The opening can be formed in the cover or base. The package can include one other cover which is configured to assemble with the base such that the one other cover and base define one other cavity in which the signal conditioner is enclosed.

The sensing element can be a piezo resistive silicon die. The actuator can be a spherical object, such as a metallic ball, retained in the opening. The signal conditioner can be an ASIC including temperature compensating circuitry and/or amplification circuit.

One or more lead frames can be carried on the package. The force sensing element and signal conditioner can be electrically coupled to the lead frame(s) for electrically connecting the force sensing element and the signal conditioner to a printed circuit board.

According to yet another aspect, a method of packaging a force sensor comprises providing a housing, arranging a force sensing element on the housing, operably coupling an actuator on the housing to the force sensing element for transferring a force to the force sensing element in response to receiving the force from an external source, and arranging a signal conditioner also on the housing for receiving the output signal, whereby, when the signal conditioner is electrically coupled to the force sensing element, the signal conditioner can condition the output signal and provide a conditioned output.

Preferably, the housing defines a cavity. The method step of arranging the force sensing element on the housing comprises enclosing the force sensing element in the cavity, and wherein the method step of operably coupling the actuator on the housing to the force sensing element comprises arranging the actuator on the housing to transfer the force to the interior of the cavity.

Preferably, the housing further defines one other cavity. The method step of arranging the signal conditioner on the housing comprises enclosing the signal conditioner in the one other cavity.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

The particular values and configurations discussed in these non-limiting examples can be varied and are cited merely to illustrate at least one embodiment of the present invention and are not intended to limit the scope of the invention.

Figure 1:
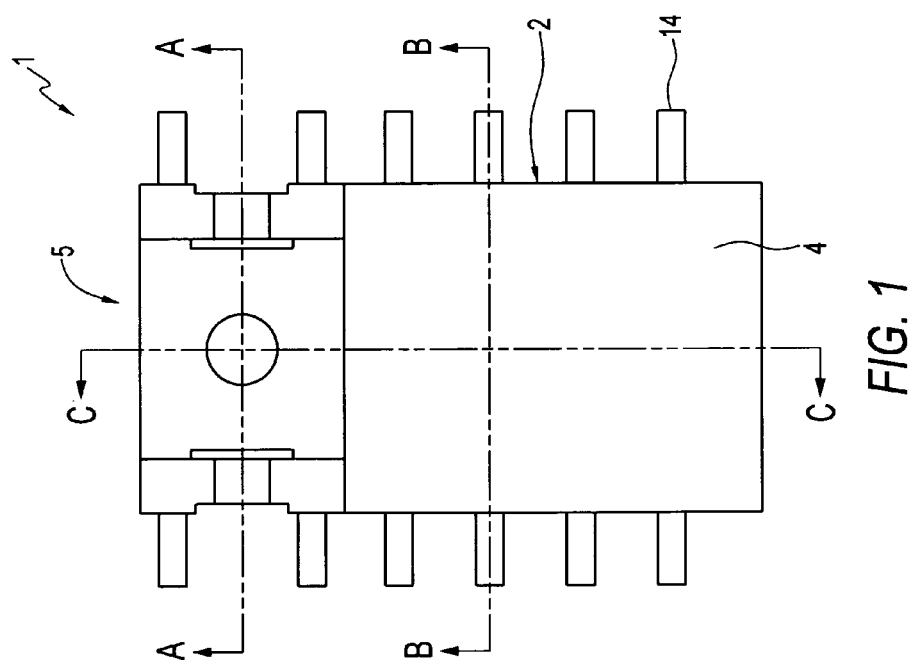
FIG. 1 illustrates a plan view taken from above the force sensor package according to a preferred embodiment.
Figure 4:
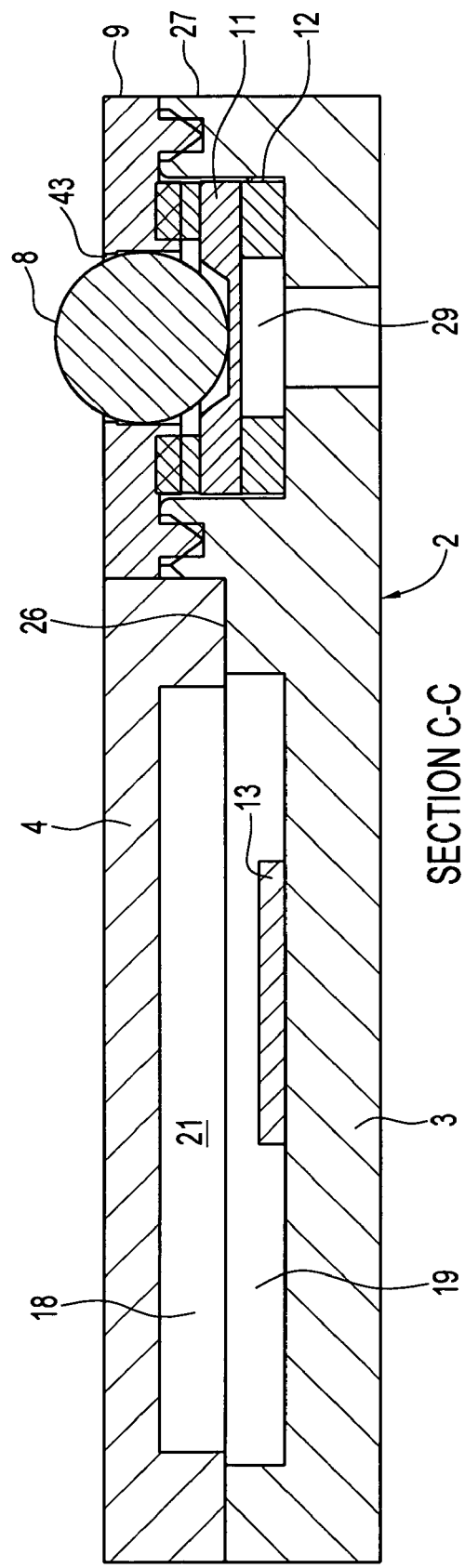
Figure 6:
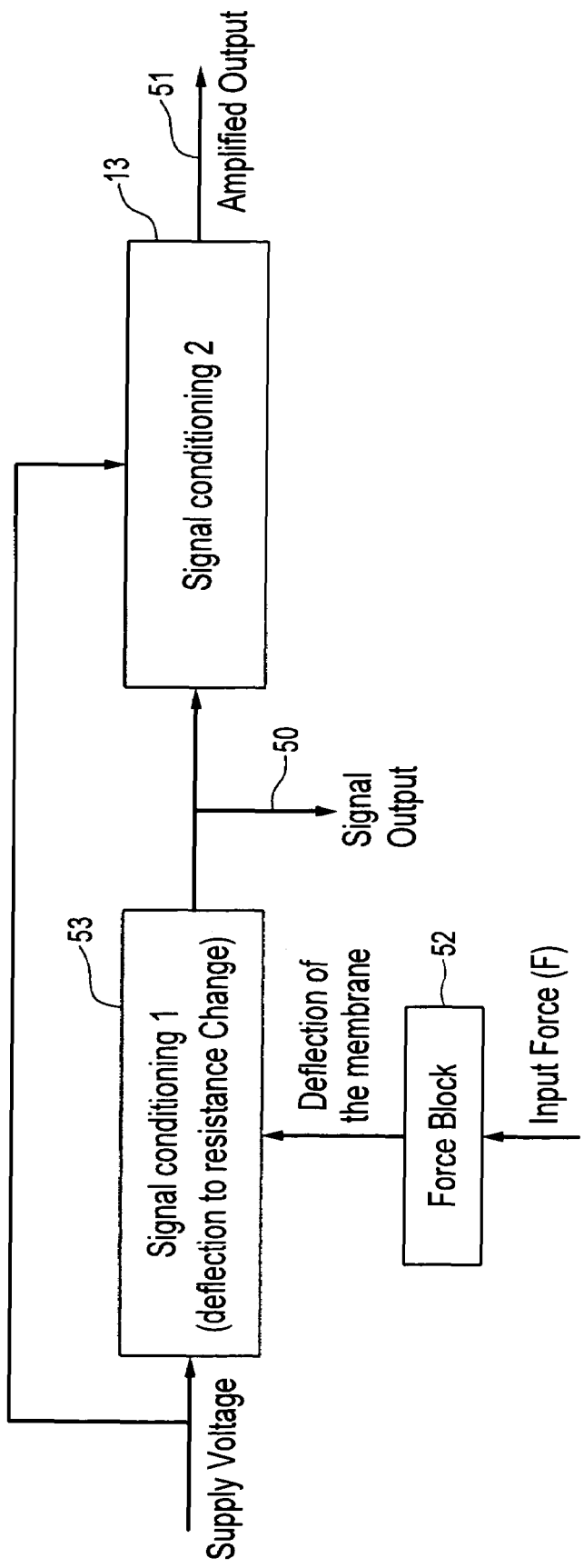
FIG. 6 illustrates a functional block diagram of the force sensor package of FIG. 1 subsequent to being incorporated in an electrical circuit in which the force sensing element is electrically coupled to the signal conditioner.

Referring to FIG. 1 of the accompanying drawings, which illustrates a plan view taken from above the force sensor package according to one embodiment, in conjunction with FIG. 4, which illustrates a cross-sectional view taken along line C-C of FIG. 1, the force sensor package 1 generally includes a force sensing element 11 carried on a housing or package 2 and an actuator 8, also carried on the housing, for receiving an external force. Actuator 8, operably coupled to the sensing element 11, exerts force against the sensing element in response to an external force being applied to the actuator. Also carried on the housing 2 is a signal conditioner 13 for conditioning the output signal. As shown in FIG. 6, which illustrates a functional block diagram of the force sensor package incorporated in an electrical circuit in which the force sensing element and signal conditioner are electrically coupled together, the force sensing element 11 is configured to sense the force exerted against the actuator 8 and generate an output signal 50 representing the applied external force. When the signal conditioner 13 is electrically coupled to the force sensing element 11, the signal conditioner 13 can condition the output signal 50 and generate a conditioned output signal 51.

By arranging the signal conditioner 13 on the same housing 2 as the actuator 8 and sensing element 11, a discrete, low cost force sensor package 1 can be provided. Advantageously, both the force sensing element and the signal conditioner can be incorporated into a single package which is entirely self contained. The force sensor package 1 can be mounted on a circuit (not shown), such as a PCB, with a smaller surface area than the surface area required to mount existing force sensing and signal conditioning hardware so that less total surface area is occupied on the circuit.

In the illustrative embodiment of the force sensor package 1, the force sensing element 11 comprises piezo-resistive silicon force sensor die 11, such as a micro machined piezoresistive Si-sensor die having a resistive bridge network as is known in the art. However, other types of pressure sensitive devices, such as a piezo resistive MEMS device or other force sensitive components, can be employed instead of a piezo-resistive silicon die. Also, in the illustrative embodiment, the actuator 8 comprises a spherical object 8, such as a stainless steel ball or other type of metallic ball, disposed in an opening 43 formed in the external surface of the housing 2 and in contact with the force sensing element 11. However, other types of actuators 8 can be readily utilized in the force sensor package 1, such as for example, slidably mounted plungers or shafts or point contact type components other than spherical objects.

The housing 2 of the force sensor package 1 of the illustrative embodiment is a surface mount technology package of elastomeric construction. However, the housing 2 need not be a SMT package and can be any type of housing made from plastic or other material, preferably having a high melting point, which is suitable for carrying the actuator, sensing element and signal conditioner and electrically isolating the components as required. An example of a piezoresistive pressure transducer having an elastomeric construction is disclosed in U.S. Pat. No. 5,184,107 which is entitled "Piezoresistive pressure transducer with a conductive elastomeric seal", issued to Maurer on Feb. 2, 1993, and which is incorporated herein by reference.

Figure 5:
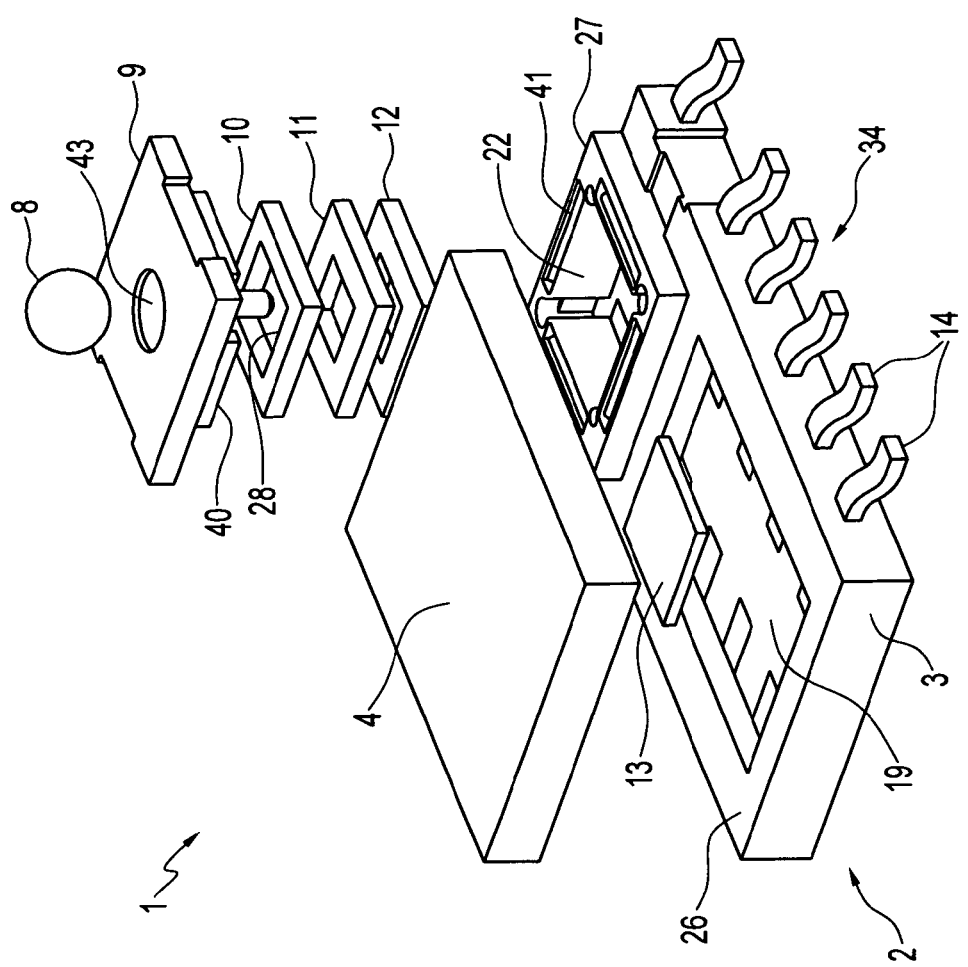
FIG. 5 illustrates an exploded perspective view of a force sensor package of FIG. 1.

Referring additionally to FIG. 5, which illustrates an exploded perspective view of the force sensor package of FIG. 1, the housing 2 includes first and second cavities 21, 29 in which the force sensing element 11 and signal conditioner 13 are respectively enclosed together with their associated components. The housing cavities 21, 29 can be formed in the housing in a variety of manners. Enclosing the signal conditioner 13 and force sensing die 11 in separate cavities enables a robust sensor package to be provided.

Figure 2:
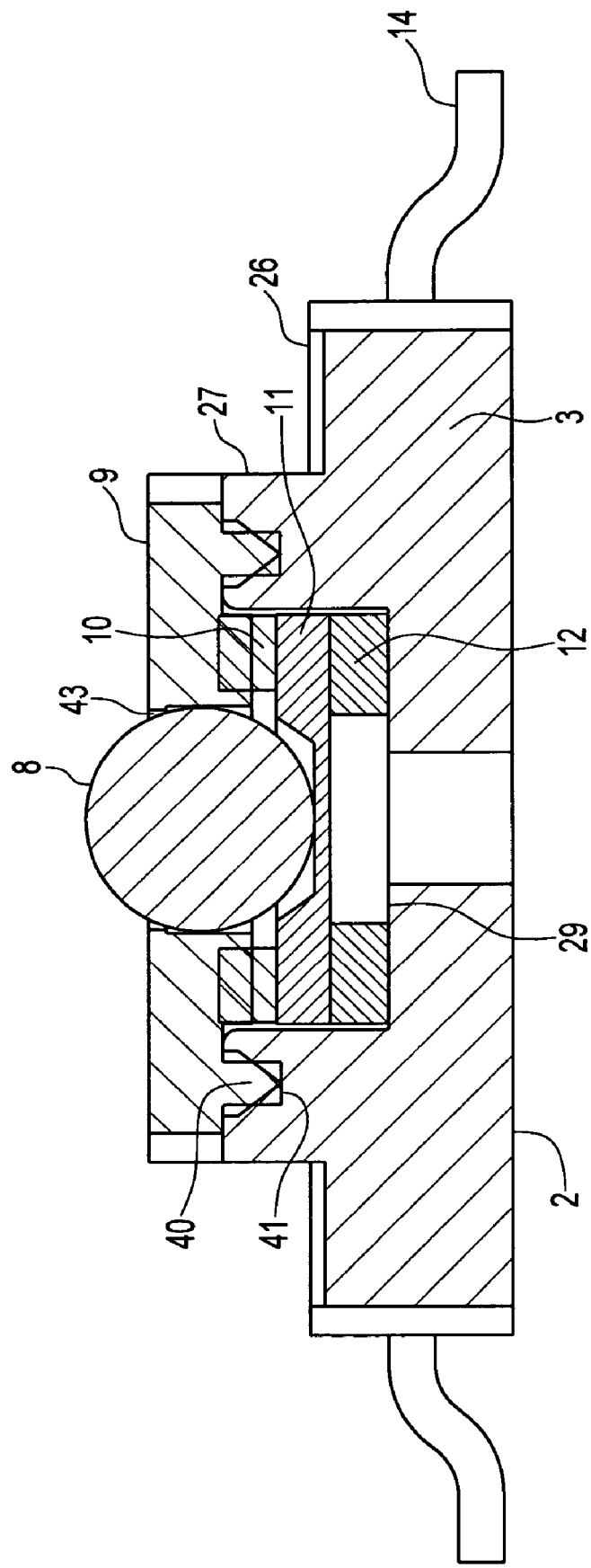
FIGS. 2-4 illustrate cross-sectional views taken along lines A-A, B-B and C-C, respectively, of FIG. 2.
Figure 3:
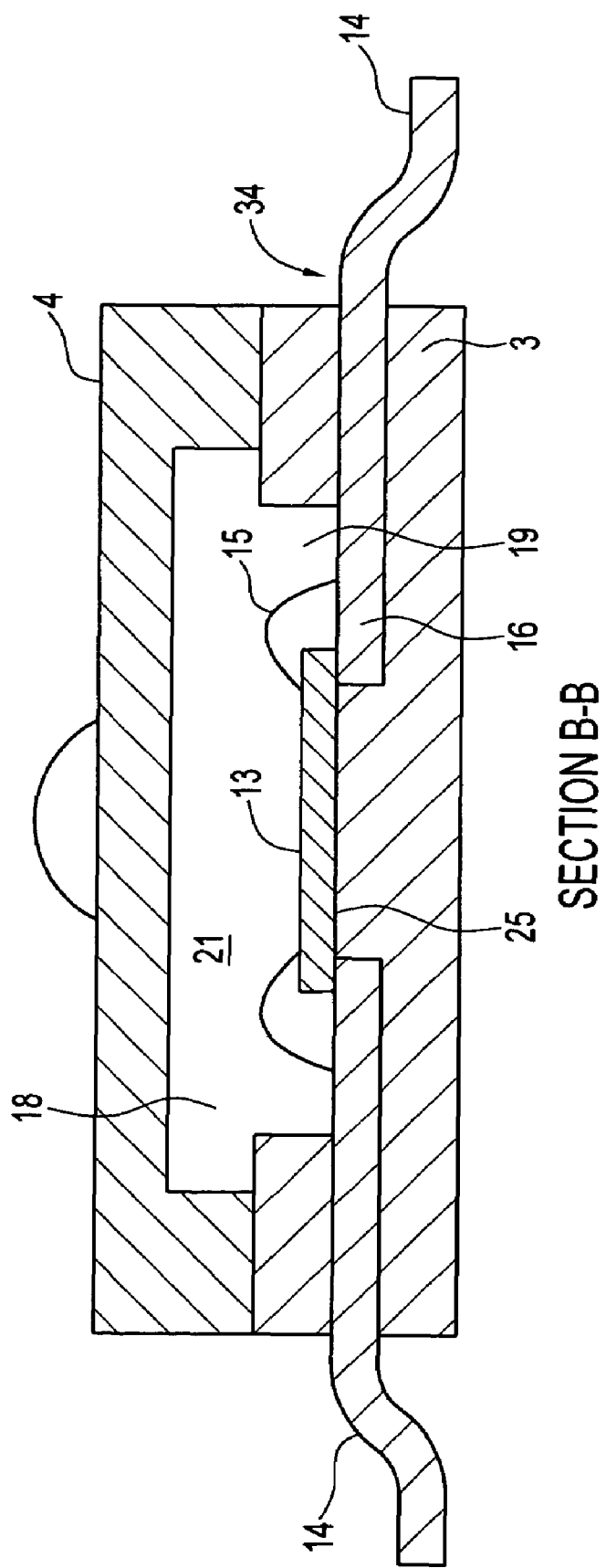

As best shown in FIG. 2, which illustrates a cross-sectional view taken along line B-B of FIG. 1, and FIG. 5, the housing 2 includes a first cover 4 and base 3 which are configured to assemble with one another such that when the first cover is attached to the base, the first cover and base define the first cavity 21.

A recess 19, formed in the upperside of the base 3, has a bottom surface 25 on which is disposed the signal conditioner die 13. The signal conditioner 13 is electrically coupled to a lead frame 34, carried on the base 3, for mounting to contact pads of a PCB. Lead frame 34 is preferably insert molded in housing 2 and includes individual leads or pins 14 for surface mounting to corresponding conductive pads of a PCB. Bond wires 15 electrically connect the signal conditioner 13 to portions 16 of leads 14 which lead portions are embedded in the recess bottom surface 25 and extend outwardly through the base to the exterior.

First cover 4 has a complimentary recess 18 formed in its underside and is ultrasonically welded or heat sealed to the base 3 covering the base recess 19 so that the base recess 19 together with the first cover recess 18 form the cavity 21 in which signal conditioner 13, associated bond wires 15 and lead portions 16 are sealed. Those skilled in the art would understand that the first cover 4 can be sealed to the base by methods other than ultrasonic welding or heat sealing. If required, alignment pins can be incorporated into the base 3 to enable the package 1 to be positioned accurately on a PCB.

In the illustrative embodiment, the signal conditioner 13 preferably comprises an ASIC. The ASIC may be configured as a digital amplifier with a built in temperature sensor for compensating temperature induced changes of the force sensor die output signal 50 caused by temperature affecting the operating characteristics of the force sensor package components. A differential sensor signal conditioner ZMD31050, supplied by ZMD America, Inc. Sensor ICs Business Unit 201 Old Country Road, Suite 204 Melville, N.Y. 11747 U.S.A., is an example of such an ASIC.

Figure 7:
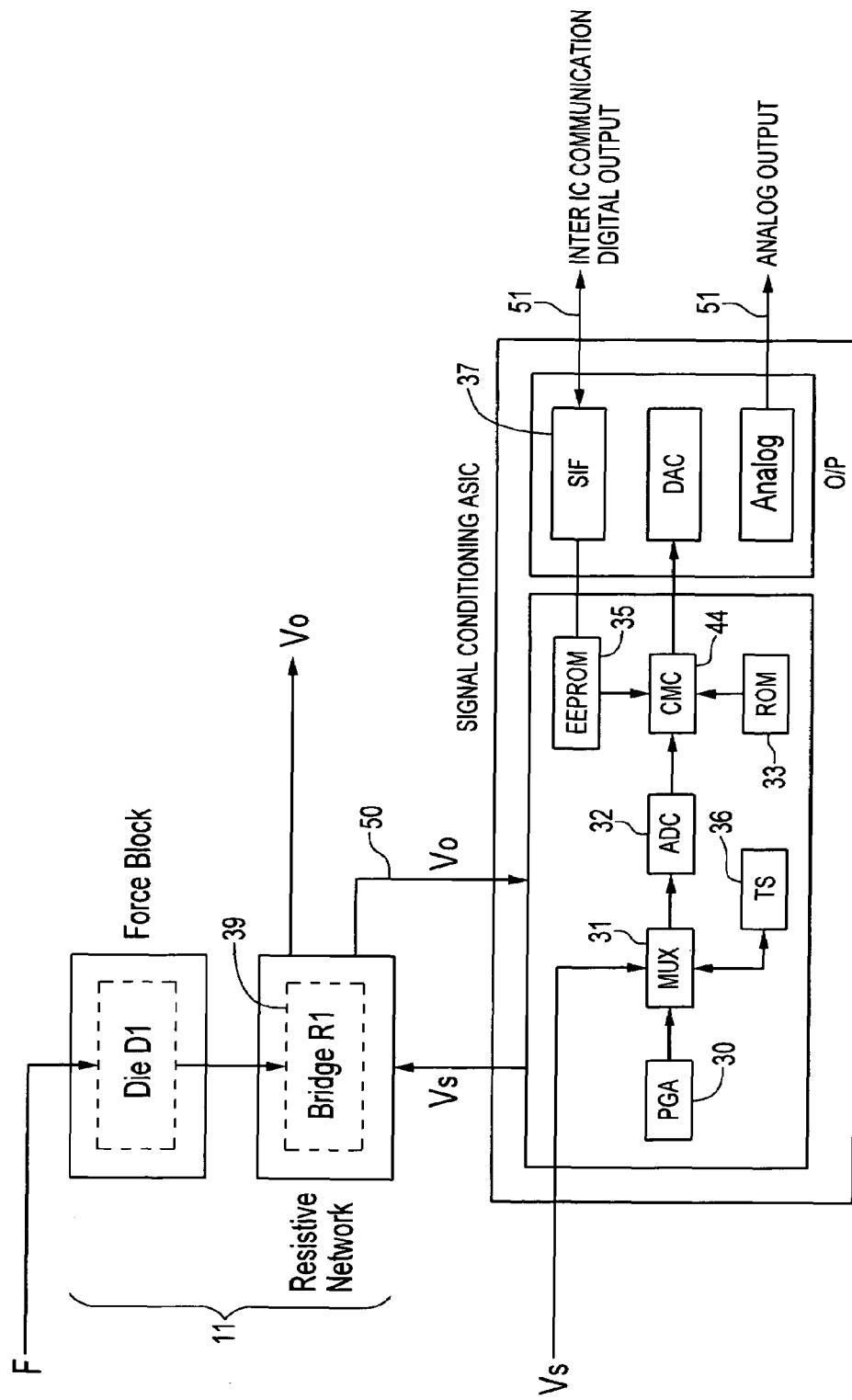
FIG. 7 illustrates a functional block diagram based on FIG. 6 also illustrating the electrical components of the ASIC and piezo resistive silicon die of the force sensor package of FIG. 1.

ASIC signal conditioner 13 is shown in FIG. 7 which illustrates a block diagram of the electrical components of the force sensing die 11 electrically coupled to the ASIC 13. The differential output from the resistive bridge 39 of the sensor die 11 is pre-amplified by the programmable gain amplifier 30 (PGA). A multiplexer 31 (MUX), coupled to the PGA 30, transmits the signals from the bridge 39 to the analog-to-digital converter 32 (ADC). A temperature sensor 36 is configured to communicate with the MUX 31. A calibration microcontroller (CMC) 44 corrects the digital signal based on calibration rules and data located in memory ROM 33 and EEPROM 35. A digital-to-analog converter (DAC) converts the calibrated signal from the CMC back to analog providing an output 51 in analog format and a serial interface (SI) 37 provides output 51 in digital format. The ASIC circuitry is therefore configured to provide a digital output or an analogue output as indicated in FIG. 7. Alternatively, other types of signal conditioners can be employed such as an instrumentation amplifier or an operational amplifier.

Referring to FIG. 5 in conjunction with FIG. 2, which illustrates a cross-sectional view taken along line A-A of FIG. 1, also formed in the base upperside, adjacent and spaced from recess 19, is another recess 22 having sidewalls 27 which protrude upwardly beyond the base upper surface 26. Recess 22 is dimensioned so that the piezo-resistive Si sensor die 11 together with an elastomeric sealing plate 10 and an elastomeric conductive plate 12 can be accommodated in the recess 22 with the sensor die 11 sandwiched between the sealing and conductive plates 10,12 as shown in FIG. 2. The sealing plate 10 has a throughhole 28 in which the actuator 8, in this case metallic ball 8, is disposed in contact with the piezo-resistive Si sensor 11.

A second cover 9 is securely attached in position, in cooperation with the base 3, covering recess 22 such that the second cover 9 and base 3 form another cavity 29 in which the sensing die 11, sealing plate 10 and conductor plate 12 and actuator 8 are retained in their operating positions by the second cover. The second cover 9 is fitted to the base 3 by means of longitudinal lugs or protrusions 40, which are arranged to engage mating recesses 41 formed in the top of sidewalls 27, and subsequently ultrasonically bonded or heat welded to the base. The sealing and conductive plates 10, 12 ensure that the sensor die 11 is sealed within the housing 2.

By isolating the forces sensing die 11 from the signal conditioner 13, the stack of elastomeric sealing plate 10, force sensing element 11 and elastomeric conductive plate 12 can be maintained in a constrained position ensuring that there is no relative movement in the stack elements.

The sensor die 11 is electrically coupled to the lead frame 34, which extends through the housing to the cavity 29, via elastomeric conductive seal 12. The actuator ball 8 protrudes through the opening 43 formed in the second cover 9 so that an external force applied to the external surface of the second cover is concentrated through the ball 8 directly to the sensor die 11. The metallic ball 8 provides high mechanical stability and is adaptable to a variety of applications.

By encapsulating both the signal conditioner 13, the force sensing die 11 and actuator 8 within the same housing 3, a discrete, self-contained low cost force sensor package 1 can be produced. Furthermore, utilizing a single package 1 enables the cost of installing the signal conditioner 13 and the force sensing die 11, together with the actuator 8, on a PCB, or other external circuit, to be reduced and secondary operations associated with installation to be eliminated. Also, employing a single housing 2, particularly a SMT package, provides a miniature force sensor that can be mounted on a PCB with a smaller pad dimension ensuring less space is occupied on the PCB. Furthermore, the force sensor package 1 can directly provide an amplified and/or temperature compensated force sensing reading which would be advantageous in medical sensing applications and other sensing applications.

In the illustrative embodiment of the force sensor package shown in the accompanying figures, the sensor die 11 and signal conditioner 13 are located in separate cavities 21, 29 isolated from one another and electrically connected to respective leads 14 of the lead frame 34 so that the sensor die 11 and signal conditioner 13 can be electrically coupled together externally via the PCB circuitry to which the lead frame 34 is mounted. Alternatively, however, the signal conditioner 13 and sensor die 11 can be electrically connected together internally by means of the lead frame 34 itself which could be insert molded into the housing such that the frame interconnects cavities 21 and 29.

A method of packaging a force sensor according to one embodiment will now be described with reference to the force sensor package of the illustrative embodiment shown in FIGS. 1-5. Initially, the base 3 and first and second covers 4, 9, formed by plastic molding techniques known in the art, are provided. Thereafter, the lead frame 34 is embedded in the base 3 by means of insert molding techniques.

The signal conditioner 13, which is preferably an ASIC 13 die, is located in base recess 19 and bonded to the recess bottom surface 25. Preferably, the ASIC 13 is located in the recess 19 with at least part of the ASIC die situated in direct thermal contact with the lead frame 34 so that the temperature sensor in the ASIC can more efficiently sense temperature changes of the package 1 for compensation purposes.

Electrical contacts/pins (not shown) on the ASIC 13 can be then electrically connected to respective embedded portions 16 using bond wires 15 which are conductively bonded at one end to the ASIC contacts and at the other end to the respective lead portions 16. Conductive bonding can be performed by known reflow soldering techniques at a maximum peak reflow temperature of the order of 250° C. or by other techniques apparent to those skilled in the art. The first cover 4 is ultrasonically bonded or heat sealed to the upper surface 26 of the base 3 such that the first cover 4 and recess 19 form the cavity 21 in which the ASIC 13 and wire bonding 15 are sealed.

The conductive sealing plate 12, force sensing die 11 and sealing plate 10 are mounted in the other base recess 22 so that the force sensing die 11 is held sandwiched between the plates 12, 10. The actuator ball 8 is then mounted in the sealing plate throughhole 28 in contact with the force sensing die 11. Thereafter, the second cover 9 is aligned with the sidewall 27, the second cover protrusions 40 are press fit into the sidewall mating recesses 41 and the second cover ultrasonically bonded to the base such that the second cover 9 is securely attached to the top of the sidewall 27 and thereby retains the force sensing die 11 together with the conductive sealing and sealing plates 12, 10 and ball 8 in their operating positions in the cavity 29 defined by the second cover 9 and recess 22.

Preferably, the sensor die and signal conditioner are formed at the wafer level using conventional semiconductor and micro electro mechanical system (MEMS) equipment and fabrication techniques. The sensor dies and signal conditioners are singulated using known dicing or sawing techniques and then assembled in diced form on the bases together with the sealing plates. Following wire bonding by reflow soldering, the sensor dies, signal conditioners and associated components are sealed in the packages by attaching the covers thereby forming the final force sensor assembly.

A method of operating the force sensor package according to one embodiment will now be described with reference to the accompanying drawings and, in particular, FIGS. 6 & 7.

Initially, the force sensor package is connected to an external control circuit (not shown) and the signal conditioner and force sensing element are electrically connected together via the control circuit. In the case of the force sensor package shown in FIG. 1, the package 1 is incorporated into the control circuit by surface mounting the package on an external PCB forming part of a control circuit. The force sensor die 11 and ASIC 13 are electrically connected together via the PCB so that the sensor die output signal 50 can be fed via the PCB to the ASIC. An external power supply (not shown) supplies a power voltage Vs to the sensor and ASIC dies via the appropriate leads 14.

Actuator 8 exerts a force against the force sensor die 11 in response to an external force being applied to the external surface of the second cover 9. As indicated in FIGS. 6 & 7, the force sensor die 11 generates a sensor output signal 50 representing the applied force and the output signal is then fed to the signal conditioner 13 which conditions the sensor signal. In the example of the force sensor package of FIG. 1, the actuator 8 is a metallic ball which transfers the force directly to the sensor die 11 causing deflection of the sensor die bridge resistors which deflection causes a change in resistance delta R of the bridge. This change of resistance causes the sensor output voltage Vo to change. Signal conditioner 13 receives the change in output signal voltage and accordingly conditions the change in sensor signal. The ASIC preferably includes temperature compensation and amplification of the sensor signal.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered.

For example, in the illustrative embodiments, separate covers can assemble with the base to form respective signal conditioner and force sensing cavities, however, a single cover could be configured to cooperate with the base to form both cavities. Furthermore, the signal conditioner may be isolated from the force sensing die and associated elements without enclosing the signal conditioner in a cavity.

The description as set forth is not intended to be exhaustive or to limit the scope of the invention. Many modifications and variations are possible in light of the above teaching without departing from the scope of the following claims. It is contemplated that the use of the present invention can involve components having different characteristics. It is intended that the scope of the present invention be defined by the claims appended hereto, giving full cognizance to equivalents in all respects.

The embodiments of the invention in which an exclusive property or right is claimed are defined as follows. Having thus described the invention what is claimed is:

1. A force sensor comprising:
a housing;
a force sensing element carried on said housing;
an actuator, operably coupled to said force sensing element and extending through an opening in the housing such that the actuator is directly accessible from external to the housing, the actuator transferring force to the sensing element in response to receiving an external force from a source located external to said housing, said force sensing element being configured to sense said external force and generate an output signal representing said external force; and
a signal conditioner, also carried on said housing, for receiving said output signal;
wherein said housing defines a first cavity in which said force sensing element is housed;
said housing further defines a second cavity which is isolated from said first housing cavity by said housing and in which said signal conditioner is enclosed such that said force sensing element is isolated from said signal conditioner; and
whereby, when said signal conditioner is electrically coupled to said force sensing element, said signal conditioner can condition said output signal and generate a conditioned output.

2. The sensor of claim 1, wherein said housing comprises a surface mount technology (SMT) package.

3. The sensor of claim 1, wherein said actuator comprises a metallic ball configured to directly transfer said external force to said force sensing element.

4. The sensor of claim 1, further comprising at least one lead frame carried on said housing and extending into said first and second cavities; and
wherein said force sensing element and said signal conditioner circuitry are electrical coupled to said at least one lead frame.

5. The sensor of claim 4, wherein said at least one lead frame electrically connects said force sensing element and said signal conditioner circuitry internally in said housing.

6. The sensor of claim 4, wherein said force sensing element comprises a piezo resistive silicon die, said piezo resistive silicon die being sandwiched between a pair of sealing members arranged in said first cavity.

7. The sensor of claim 4, wherein said signal conditioner and said force sensing element are encapsulated in said housing, and wherein said housing is a plastic housing.

8. The sensor of claim 1, wherein said signal conditioner comprises an ASIC, an instrumentation amplifier, or an operational amplifier, and optionally a temperature compensating circuit.

9. The sensor of claim 1, wherein said housing comprises:
a first cover having a recess;
a second cover having a recess; and
a base having first and second recesses formed in an upperside of said base, said first recess of said base being adjacent and separated from said second recess by sidewalls of said first and second recesses protruding upwardly from said base;
wherein said first cover recess and said first base recess form said first cavity; and
wherein said second cover recess and said second base recess form said second cavity, said first and second cavities being isolated from one another by said base and covers.

10. The force sensor of claim 1, wherein the actuator extends through an opening in the housing and projects away from the housing.

11. A force sensor package comprising:
a housing comprising a surface mount technology (SMT) package having an external surface and an opening formed in said external surface;
a force sensing element disposed in the interior of said package;
an actuator, disposed in said opening, for transferring force to the force sensing element of said package in response to receiving an external force from an external source, said force sensing element being configured to detect said force transferred by said actuator and to generate an output signal representing said force; and
a signal conditioning circuit, integrated in said package for receiving said output signal;
wherein said SMT package comprises a base and a cover, said base and said cover being configured to assemble with one another such that said cover and said base define a SMT package cavity in which said force sensing element is located, said opening being formed in said cover or said base and said actuator being configured to transfer said external force from the external source to the force sensing element located in the interior of said SMT package cavity; and
wherein said SMT package further comprises one other cover, said one other cover being configured to assemble with said base such that said one other cover and said base define one other SMT package cavity in which said signal conditioner circuit is located, wherein said SMT package cavities are isolated from one another by said package such that said signal conditioner is physically isolated from said force sensing element and such that said signal conditioner and said force sensing element are enclosed in said package;
whereby, when said signal conditioner is electrically coupled to said force sensing element, said signal conditioner can condition said output signal and provide a conditioned output from said SMT package.

12. The sensor of claim 11, further comprising at least one lead frame carried on said SMT package and extending into said cavities; and
wherein said force sensing element and said signal conditioner circuit are electrical coupled to said at least one lead frame.

13. The sensor of claim 12, wherein said at least one lead frame interconnects said cavities and electrically connects said force sensing element and said signal conditioner circuit internally in said housing.

14. The sensor of claim 12, wherein said force sensing element comprises a piezo resistive silicon die or a piezo resistive MEMS device; and
wherein said signal conditioner circuitry comprises an ASIC.

15. The sensor of claim 14, wherein said actuator comprises a metallic ball configured to directly transfer said external force to said piezo resistive silicon die or a piezo resistive MEMS device.

16. The sensor of claim 11, wherein said sensor comprises a piezo resistive.

17. The sensor of claim 11, wherein:
said cover includes a recess; and
wherein said base includes first and second recesses formed in an upperside of said base, said first recess of said base being laterally adjacent and separated from said second recess by sidewalls of said first and second recesses protruding upwardly from said base; and
wherein said recess of said cover and said first base recess form said SMT package cavity; and
wherein said one other cover and second base recess form said one other SMT package cavity, said SMT package cavity and said one other SMT package cavity being isolated from one another by said base and covers.

18. The sensor of claim 11, further comprising at least one lead frame, carried on said package, said force sensing element and said signal conditioner being electrically coupled to said lead frame(s) for electrically connecting said force sensing element and said signal conditioner to a printed circuit board.

19. A method of packaging a force sensor comprising:
providing a housing defining separate first and second cavities, said first and second cavities being physically isolated from one another by said housing;
providing a force sensing element in said first cavity of said housing;
operably coupling an actuator to said force sensing element for transferring a force generated externally of the housing to said force sensing element wherein, the actuator extends through an opening in the housing such that the actuator is directly accessible from external to the housing; and
providing a signal conditioner, for receiving said output signal, in said second cavity of said housing such that said force sensing element is physically isolated from said signal conditioner, whereby, when said signal conditioner is electrically coupled to said force sensing element, said signal conditioner can condition said output signal and provide a conditioned output.

20. The method of claim 19, further comprising:
configuring at least one lead frame on said housing, said at least one lead frame extending into said first and second cavities; and
electrically coupling said force sensing element and said signal conditioner circuitry to said at least one lead frame.

21. The method of claim 20, wherein providing said housing comprises providing a SMT package;
wherein providing said force sensing element in said first cavity comprises enclosing a piezo resistive silicon die or a piezo resistive MEMS device in said first cavity; and
wherein providing said signal conditioner in said second cavity comprises enclosing an ASIC in said second cavity.

* * * * *